(12) United States Patent
Huang et al.

(10) Patent No.: US 9,866,015 B2
(45) Date of Patent: Jan. 9, 2018

(54) DISCHARGE CIRCUIT AND MOTHERBOARD UTILIZING THE SAME

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Kai-Long Huang, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 429 days.

(21) Appl. No.: 14/691,327

(22) Filed: Apr. 20, 2015

(65) Prior Publication Data

US 2016/0211661 A1    Jul. 21, 2016

(30) Foreign Application Priority Data

Jan. 20, 2015  (CN) .......................... 2015 1 0026524

(51) Int. Cl.
*H02H 9/00*    (2006.01)
*H02H 9/04*    (2006.01)

(52) U.S. Cl.
CPC .................... *H02H 9/041* (2013.01)

(58) Field of Classification Search
CPC ........................................ H02H 9/041
USPC ............................................. 361/56
See application file for complete search history.

(56) References Cited

U.S. PATENT DOCUMENTS

| | | | | |
|---|---|---|---|---|
| 6,552,594 B2* | 4/2003 | Lin | ..................... | H01L 27/0255 327/310 |
| 7,274,545 B2* | 9/2007 | Marum | .................. | H02H 9/046 361/56 |
| 8,355,228 B2* | 1/2013 | Hirata | ................. | H01L 27/0266 361/56 |
| 8,570,092 B2* | 10/2013 | Li | .................... | G01R 31/31857 327/427 |

* cited by examiner

*Primary Examiner* — Stephen W Jackson
(74) *Attorney, Agent, or Firm* — ScienBiziP, P.C.

(57) ABSTRACT

A discharge circuit applied in a motherboard includes a platform controller hub (PCH), a first electronic switch, a second electronic switch, and first capacitor. A control terminal of the first electronic switch is coupled to a standby pin of the PCH. A second terminal of the first electronic switch is coupled to the standby power. A control terminal of the second electronic switch is coupled to the second terminal of the first electronic switch. A second terminal of the second electronic switch is coupled to a first power source through a resistor coupled with a capacitor in parallel. The standby pin of the PCH outputs a digital low signal, to control the first electronic switch is turned off rapidly, and the second electronic switch is turned on. A voltage of the first power source is discharged through the resistor rapidly.

16 Claims, 2 Drawing Sheets

DISCHARGE CIRCUIT AND MOTHERBOARD UTILIZING THE SAME

FIELD

The subject matter herein generally relates to a discharge circuit and a motherboard utilizing the discharge circuit.

BACKGROUND

After a computer is shut down, some system power sources of the computer need to be discharged through capacitors for some time, which is danger and troublesome for users to change or test components on the motherboard during the discharge operation.

Therefore, there is need for improvement in the art.

BRIEF DESCRIPTION OF THE DRAWINGS

Implementations of the present technology will now be described, by way of example only, with reference to the attached figures.

DETAILED DESCRIPTION

Figure 1:
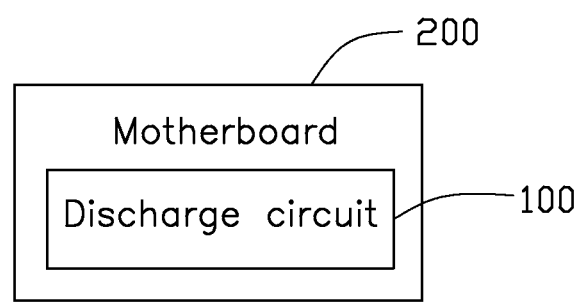
FIG. 1 is a block diagram of an example embodiment of a motherboard.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The disclosure will now be described in relation to a motherboard.

FIG. 1 illustrates a block diagram of an example embodiment of a motherboard 200. The motherboard 200 is applied in an electronic device, such as a computer.

Figure 2:
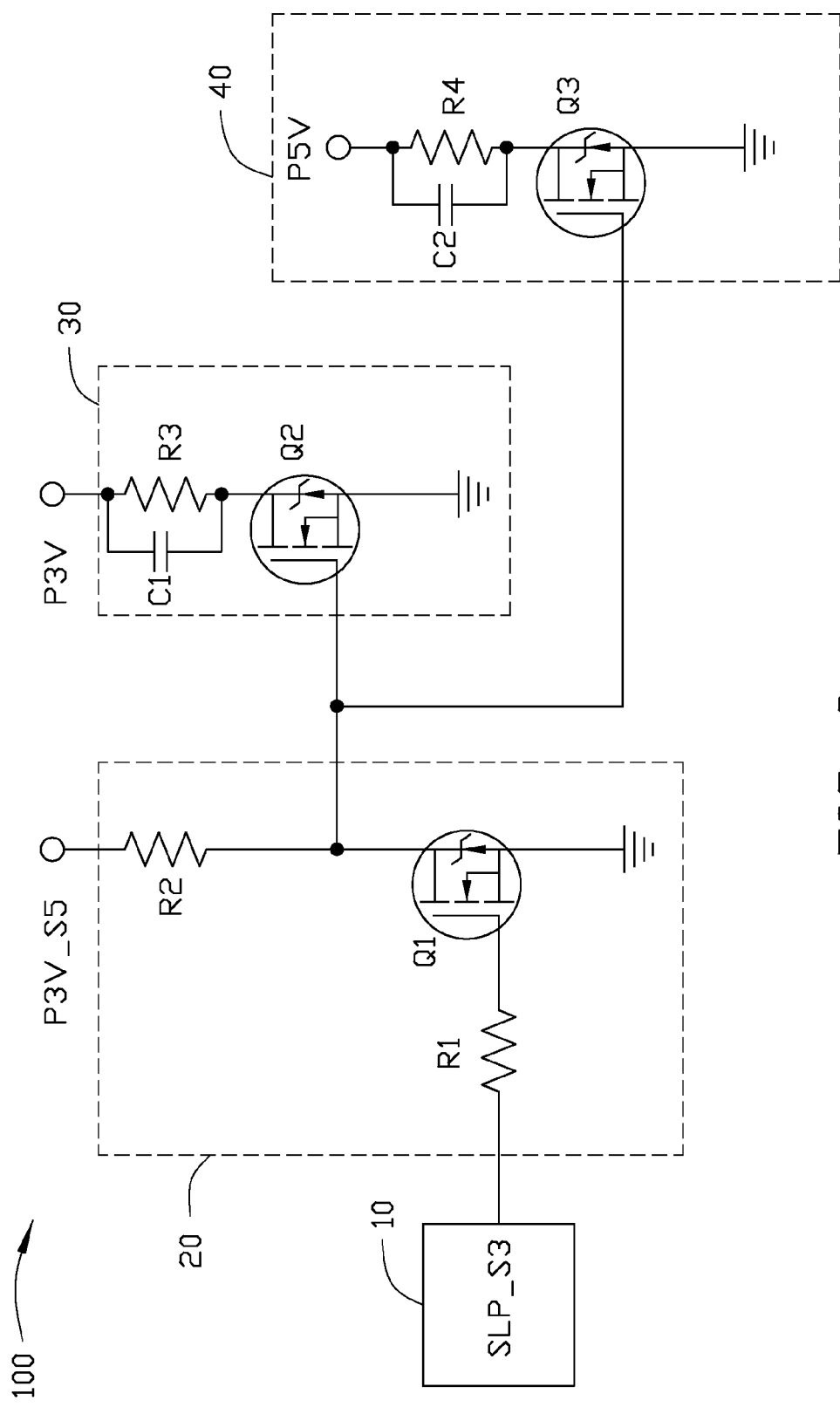
FIG. 2 is a circuit diagram of an embodiment of a discharge circuit on the motherboard of FIG. 1.

FIG. 2 illustrates an embodiment of the discharge circuit 100 including a platform controller hub (PCH) 10, a first control unit 20, a second control unit 30, and a third control unit 40. The first control unit 20 includes resistors R1 and R2, and a n-channel metal oxide semiconductor field-effect transistor (MOSFET) Q1. The second control unit 30 includes a capacitor C1, a resistor R3, and a n-channel MOSFET Q2. The third control unit 40 includes a capacitor C2, a resistor R4, and a n-channel MOSFET Q3.

A gate of the n-channel MOSFET Q1 is coupled to a standby pin SLP_S3 of the PCH 10 through the resistor R1. A drain of the n-channel MOSFET Q1 is grounded. A source of the n-channel MOSFET Q1 is coupled to a standby power source P3V_S5 through the resistor R2. A gate of the n-channel MOSFET Q2 is coupled to a drain of the n-channel MOSFET Q1. A source of the n-channel MOSFET Q2 is grounded. A drain of the n-channel MOSFET Q2 is coupled to a first power source P3V through the resistor R3. The capacitor C1 is coupled to the resistor R3 in parallel for filtering. A gate of the n-channel MOSFET Q3 is coupled to a drain of the n-channel MOSFET Q1. A source of the n-channel MOSFET Q3 is grounded. A drain of the n-channel MOSFET Q3 is coupled to a second power source P5V through the resistor R4. The capacitor C2 is coupled to the resistor R4 in parallel for filtering. The n-channel MOSFETs Q1, Q2, Q3 can be replaced by other electronic switches.

When the computer operates, the standby pin SLP_S3 of the PCH 10 outputs a digital high signal. The n-channel MOSFET Q1 is turned on. The n-channel MOSFETs Q2 and Q3 are turned off When the computer is shut down or in standby state, the standby pin SLP_S3 of the PCH 10 outputs a digital low signal. The n-channel MOSFET Q1 is turned off. Gates of the n-channel MOSFETs Q2 and Q3 receive a voltage of 3 volts output from the standby power source P3V_S5. The n-channel MOSFETs Q2 and Q3 are turned on. In the embodiment, respective resistance of the resistors R3 and R4 is 100Ω. The first power source P3V discharges through the resistor R3 rapidly, with a first discharge time T1 (T1=2.2*100*C1). The second power source P5V discharges through the resistor R4 rapidly, with a second discharge time T2 (T2=2.2*100*C2).

Therefore, when the computer is shut down or in standby state, the standby pin SLP_S3 of the PCH 10 outputs the digital low signal rapidly to control the n-channel MOSFET Q1 to turn off, and control the n-channel MOSFET Q1 to turn on. Thus, the first power source P3V and the second power source P5V can discharge rapidly through the resistors R3 and R4.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A discharge circuit comprising:
   a platform controller hub (PCH) comprising a standby pin;
   a first control unit comprising a first resistor and a first electronic switch, wherein a control terminal of the first electronic switch is coupled to the standby pin of the PCH, a first terminal of the first electronic switch is coupled to ground, a second terminal of the first electronic switch is coupled to a standby power source through the first resistor;
   a second control unit comprising a second resistor, a first capacitor, and a second electronic switch, wherein a control terminal of the second electronic switch is coupled to the second terminal of the first electronic switch, a first terminal of the second electronic switch is coupled to ground, a second terminal of the second electronic switch is coupled to a first voltage terminal, the first capacitor is coupled to the second resistor in parallel;

wherein when the standby pin of the PCH outputs a low level signal to control the first electronic switch to turn off and control the second electronic switch to turn on, the first voltage terminal discharges through the second resistor.

2. The discharge circuit of claim 1, further comprising a third control unit, wherein the third control unit comprising a third resistor, a second capacitor, and a third electronic switch; a control terminal of the third electronic switch is coupled to the second terminal of the first electronic switch, a first terminal of the third electronic switch is coupled to ground, a second terminal of the third electronic switch is coupled to a second voltage terminal through the third resistor, the second capacitor is coupled to the third resistor in parallel.

3. The discharge circuit of claim 2, wherein the first, the second, and the third electronic switches are n-channel metal oxide semiconductor field-effect transistors (MOSFETs), the control terminal, the first terminal and the second terminal of each electronic switch correspond to a gate, a source, and a drain of the MOSFET, respectively.

4. The discharge circuit of claim 3, wherein a voltage from the first voltage terminal is 3 volts, a voltage from the second voltage terminal is 5 volts.

5. The discharge circuit of claim 3, wherein each resistance of the third and fourth resistors is 100Ω.

6. The discharge circuit of claim 1, wherein the first and second electronic switches are n-channel metal oxide semiconductor field-effect transistors (MOSFETs), the control terminal, the first terminal and the second terminal of each electronic switch correspond to a gate, a source, and a drain of the MOSFET, respectively.

7. The discharge circuit of claim 6, wherein a voltage from the first voltage terminal is 3 volts.

8. The discharge circuit of claim 5, wherein a resistance of the third resistor is 100Ω.

9. A motherboard comprising a discharge circuit, the discharge circuit comprising:

a platform controller hub (PCH) comprising a standby pin;

a first control unit comprising a first resistor, and a first electronic switch, wherein a control terminal of the first electronic switch is coupled to the standby pin of the PCH, a first terminal of the first electronic switch is coupled to ground, a second terminal of the first electronic switch is coupled to a standby power source through the first resistor; and a second control unit comprising a second resistor, a first capacitor, and a second electronic switch, wherein a control terminal of the second electronic switch is coupled to the second terminal of the first electronic switch, a first terminal of the second electronic switch is coupled to ground, a second terminal of the second electronic switch is coupled to a first voltage terminal, the first capacitor is coupled to the second resistor in parallel;

wherein when the standby pin of the PCH outputs a low level signal to control the first electronic switch to turn off and control the second electronic switch to turn on, the first voltage terminal discharges through the second resistor.

10. The motherboard of claim 9, further comprising a third control unit, wherein the third control unit comprising a third resistor, a second capacitor, and a third electronic switch; a control terminal of the third electronic switch is coupled to the second terminal of the first electronic switch, a first terminal of the third electronic switch is coupled to ground, a second terminal of the third electronic switch is coupled to a second voltage terminal through the third resistor, the second capacitor is coupled to the third resistor in parallel.

11. The motherboard of claim 10, wherein the first, the second, and the third electronic switches are n-channel metal oxide semiconductor field-effect transistors (MOSFETs), the control terminal, the first terminal and the second terminal of each electronic switch correspond to a gate, a source, and a drain of the MOSFET, respectively.

12. The motherboard of claim 11, wherein a voltage from the first voltage terminal is 3 volts, a voltage from the second voltage terminal is 5 volts.

13. The motherboard of claim 11, wherein each resistance of the third and fourth resistors is 100Ω.

14. The motherboard of claim 11, wherein the first and second electronic switches are n-channel metal oxide semiconductor field-effect transistors (MOSFETs), the control terminal, the first terminal and the second terminal of each electronic switch correspond to a gate, a source, and a drain of the MOSFET, respectively.

15. The motherboard of claim 14, wherein a voltage from the first voltage terminal is 3 volts.

16. The motherboard of claim 13, wherein a resistance of the third resistor is 100Ω.

* * * * *